(12) United States Patent
Connors et al.

(10) Patent No.: US 10,660,263 B2
(45) Date of Patent: *May 26, 2020

(54) METHOD FOR SECURING AN INDUCTOR SEGMENT TO AN INDUCTOR ASSEMBLY OF AN AGRICULTURAL IMPLEMENT

(71) Applicant: CNH Industrial America LLC, New Holland, PA (US)

(72) Inventors: Michael J. Connors, Lockport, IL (US); Chad M. Johnson, Arlington Heights, IL (US); Marvin A. Prickel, Homer Glen, IL (US)

(73) Assignee: CNH Industrial America LLC, New Holland, PA (US)

( * ) Notice: Subject to any disclaimer, the term of this patent is extended or adjusted under 35 U.S.C. 154(b) by 113 days.

This patent is subject to a terminal disclaimer.

(21) Appl. No.: 15/927,420

(22) Filed: Mar. 21, 2018

(65) Prior Publication Data
US 2018/0206399 A1 Jul. 26, 2018

Related U.S. Application Data

(62) Division of application No. 14/961,339, filed on Dec. 7, 2015, now Pat. No. 9,961,826, which is a division
(Continued)

(51) Int. Cl.
*A01C 7/20* (2006.01)
*A01C 7/08* (2006.01)
*F04D 23/00* (2006.01)

(52) U.S. Cl.
CPC .............. *A01C 7/20* (2013.01); *A01C 7/081* (2013.01); *A01C 7/082* (2013.01); *A01C 7/084* (2013.01);
(Continued)

(58) Field of Classification Search
CPC .. A01C 7/20; A01C 7/00; A01C 7/081; A01C 7/08; A01C 7/082; A01C 7/084;
(Continued)

(56) References Cited

U.S. PATENT DOCUMENTS 2,764,111 A 9/1956 Collins
2,861,527 A 11/1958 Phillips
(Continued)

OTHER PUBLICATIONS

McMaster Carr; McMaster Carr Shims; http://www.mcmaster.com/#horseshoe-shims/=k4twn, 2012.
(Continued)

*Primary Examiner* — Christopher J. Novosad
(74) *Attorney, Agent, or Firm* — Rebecca L. Henkel; Rickard K. DeMille

(57) ABSTRACT

A system includes an inductor assembly of an agricultural implement having an inductor box with a wall configured to separate an interior of the inductor box from an exterior of the inductor box, an inductor segment, and a mounting clip. The wall includes an inner surface in the interior and an outer surface on the exterior. The inductor segment includes a mixing portion and a delivery portion, wherein the mixing portion interfaces with the inner surface and is configured to mix agricultural product and airflow into a mixture. The delivery portion is configured to convey the mixture through the wall. The mounting clip is configured to form a seal between the interior and the exterior of the inductor box, and to interface with the outer surface and the delivery portion in an installed position to couple the inductor segment to the inductor box.

20 Claims, 6 Drawing Sheets

Related U.S. Application Data of application No. 13/737,752, filed on Jan. 9, 2013, now Pat. No. 9,204,592.

(52) U.S. Cl.
CPC ....... F04D 23/003 (2013.01); *Y10T 29/49947* (2015.01)

(58) Field of Classification Search
CPC ...... F04D 23/003; F04D 23/001; F04D 23/00; Y10T 29/49947; Y10T 29/49826; Y10T 29/49; Y10T 29/00
See application file for complete search history.

(56) References Cited

U.S. PATENT DOCUMENTS

| | | |
|---|---|---|
| 3,073,265 A | 1/1963 | Movilla et al. |
| 3,633,522 A | 1/1972 | Main |
| 4,257,534 A | 3/1981 | Williams |
| 4,669,922 A | 6/1987 | Hooper et al. |
| 4,718,574 A | 1/1988 | Schoenmaekers |
| 5,402,741 A | 4/1995 | Truax et al. |
| 5,931,105 A | 8/1999 | Luxon |
| 6,089,478 A | 7/2000 | Truan et al. |
| 6,273,648 B1 | 8/2001 | Poncelet et al. |
| 6,666,156 B1 | 12/2003 | Mayerle et al. |
| 6,688,244 B1 | 2/2004 | Meyer |
| 7,264,423 B2 | 9/2007 | Kowalchuk |
| 9,204,592 B2 * | 12/2015 | Connors ............... F04D 23/003 |
| 9,961,826 B2 * | 5/2018 | Connors ............... F04D 23/003 |
| 2008/0105445 A1 | 5/2008 | Dayton et al. |
| 2012/0174844 A1 | 7/2012 | Friggstad |

OTHER PUBLICATIONS

Gemplers; Heavy-Duty Quarter-Turn Adapter with Collar, http://www.gemplers.com/product/WEB192982/Heavyduty-Quarter-turn-Adapter-w-Collar, 2012.

* cited by examiner

METHOD FOR SECURING AN INDUCTOR SEGMENT TO AN INDUCTOR ASSEMBLY OF AN AGRICULTURAL IMPLEMENT

CROSS-REFERENCE TO RELATED APPLICATIONS

This application is a divisional of U.S. patent application Ser. No. 14/961,339, entitled "SYSTEM FOR SECURING INDUCTOR SEGMENTS TO AN INDUCTOR ASSEMBLY OF AN AGRICULTURAL IMPLEMENT," filed Dec. 7, 2015, which is a divisional of U.S. patent application Ser. No. 13/737,752, entitled "SYSTEM FOR SECURING INDUCTOR SEGMENTS TO AN INDUCTOR ASSEMBLY OF AN AGRICULTURAL IMPLEMENT," filed Jan. 9, 2013, now U.S. Pat. No. 9,204,592, issued Dec. 8, 2015. Each of the foregoing applications is incorporated by reference in its entirety.

BACKGROUND

The invention relates generally to ground working equipment, such as agricultural equipment, and more specifically, to systems for securing inductor segments to an inductor assembly of an agricultural implement.

Generally, planting implements (e.g., planters) are towed behind a tractor or other work vehicle via a mounting bracket secured to a rigid frame of the implement. These planting implements typically include multiple row units distributed across the width of the implement. Each row unit is configured to deposit seeds at a desired depth beneath the soil surface, thereby establishing rows of planted seeds. For example, each row unit may include a ground engaging tool or opener (e.g., an opener disc) that forms a seeding path for seed deposition into the soil. In certain configurations, a gauge wheel is positioned a vertical distance above the opener to establish a desired trench depth for seed deposition into the soil. As the implement travels across a field, the opener excavates a trench into the soil, and seeds are deposited into the trench. In certain row units, the opener is followed by a packer wheel that packs the soil on top of the deposited seeds.

Certain planting implements include a remote seed tank, and a pneumatic distribution system configured to convey seeds from the tank to each row unit. For example, the pneumatic distribution system may include an inductor box positioned beneath the seed tank. The inductor box is configured to receive seeds from the tank, to fluidize the seeds into an air/seed mixture, and to distribute the air/seed mixture to the row units via a network of pneumatic hoses/conduits. Each row unit, in turn, receives the seeds from the pneumatic hoses/conduits, and directs the seeds to a metering system. The metering system is configured to provide a flow of seeds to a seed tube for deposition into the soil. By operating the metering system at a particular speed, a desired seed spacing may be established as the implement traverses a field.

Inductor segments may be attached to the inductor box to distribute the air/seed mixture to the network of pneumatic hoses/conduits. For example, threaded fasteners may attach each inductor segment to the inductor box. Unfortunately, threaded fasteners may be time consuming to install, and may increase manufacturing costs of the inductor box due to the use of many small parts, such as screws, bolts, and nuts. Moreover, threaded fasteners may loosen with vibration, thereby decreasing the efficiency of the inductor box during planting operations. Additionally, over-tightened fasteners may cause excessive wear on the inductor box and/or the inductor segment.

BRIEF DESCRIPTION

In one embodiment, a system includes an inductor assembly of an agricultural implement having an inductor box, a first inductor segment, and a first mounting clip. The inductor box includes a wall configured to separate an interior of the inductor box from an exterior of the inductor box. The wall includes an inner surface exposed to the interior and an outer surface exposed to the exterior. The inductor box is configured to receive agricultural product and an airflow. The first inductor segment includes a first mixing portion and a first delivery portion, wherein the first mixing portion interfaces with the inner surface and is configured to mix the agricultural product and the airflow into a first mixture. The first delivery portion extends through the wall and is configured to convey the first mixture to a first conduit. The first mounting clip is configured to interface with the outer surface of the wall and the first delivery portion while the first mounting clip is in a first installed position. While in the first installed position, the first mounting clip is configured to couple the first inductor segment to the inductor box and to form a first seal between the interior and the exterior of the inductor box. The first seal is formed on the inner surface of the wall.

In another embodiment, a system includes an inductor assembly of an agricultural implement having an inductor box, a gasket, an inductor segment, and a mounting clip. The inductor box includes an inner surface, an outer surface, and a delivery passage. The delivery passage extends from the inner surface to the outer surface. The gasket is disposed about the delivery passage and is configured to interface with the inner surface. The inductor segment is arranged within the inductor box and includes a delivery portion extending through the delivery passage and the gasket. The inductor segment is configured to interface with the gasket. The mounting clip is configured to interface with the outer surface of the inductor box and the delivery portion of the inductor segment while the mounting clip is in an installed position. While in the installed position, the mounting clip is configured to apply a force to compress the gasket to form a seal between the inner surface of the inductor box and the first inductor segment. The mounting clip does not interface with the inner surface of the inductor box.

In a further embodiment, a method of manufacturing an inductor assembly of an agricultural implement includes interfacing a gasket with an inner surface of an inductor box and positioning a first inductor segment within the inductor box. The gasket circumscribes a first delivery passage extending from the inner surface to an outer surface of the inductor box. The first inductor segment includes a first mixing portion and a first delivery portion that extends from the first mixing portion. The method also includes inserting the first delivery portion through the gasket and the first delivery passage, compressing the gasket to form a first seal between the inner surface of the inductor box and the first mixing portion, and installing a first mounting clip into a first installed position about the first delivery portion. The first mounting clip, while in the first installed position, is configured to maintain the first seal by interfacing with the outer surface of the inductor box.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Figure 1:
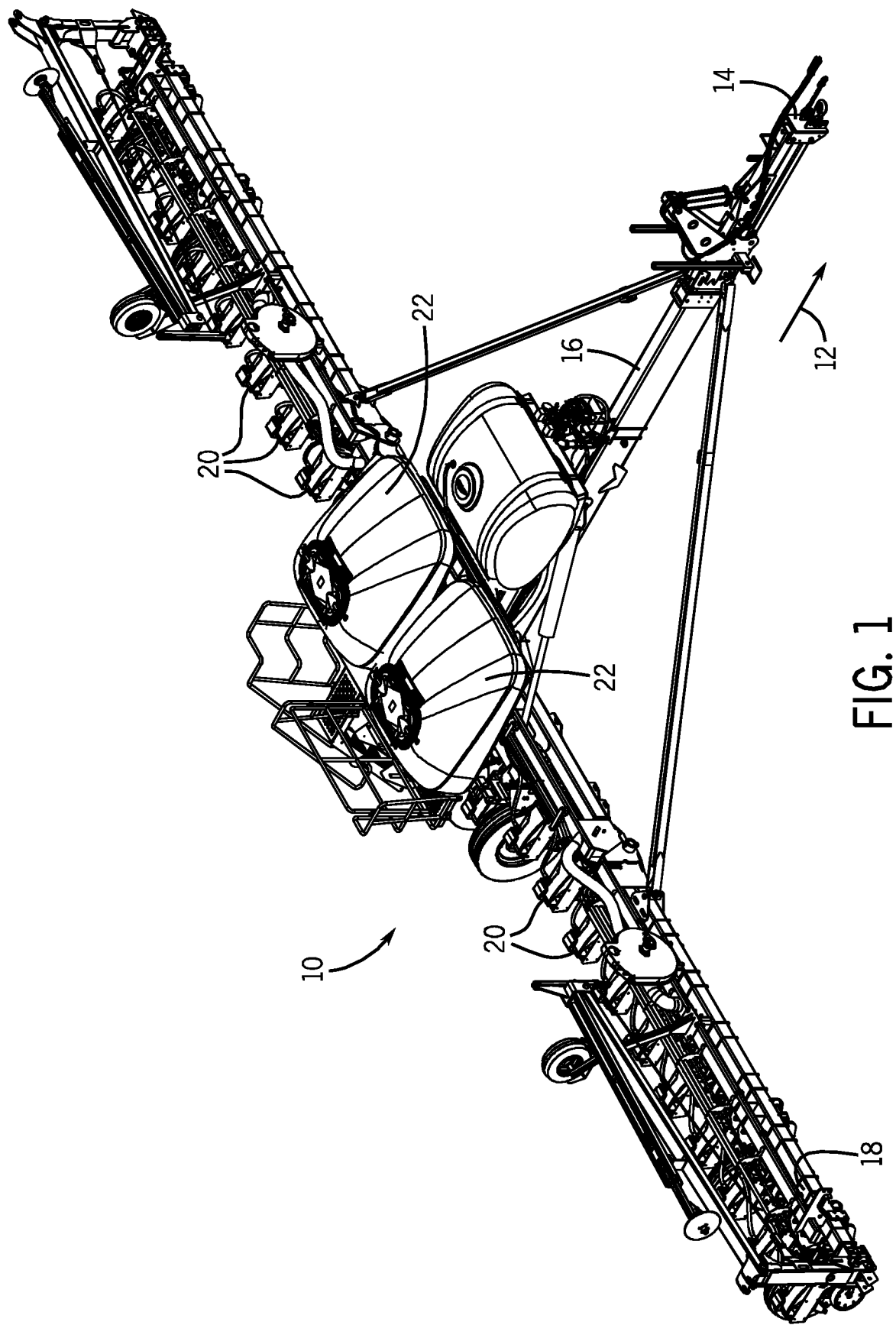
FIG. 1 is a perspective view of an embodiment of an agricultural implement configured to deposit seeds into a soil surface.

FIG. 1 is a perspective view of an embodiment of an agricultural implement 10 configured to deposit seeds into a soil surface. In the illustrated embodiment, the implement 10 is configured to be towed along a direction of travel 12 by a work vehicle, such as a tractor or other prime mover. The work vehicle may be coupled to the implement 10 by a hitch assembly 14. As illustrated, the hitch assembly 14 is coupled to a main frame assembly 16 of the implement 10 to facilitate towing of the implement 10 in the direction of travel 12. In the illustrated embodiment, the frame assembly 16 is coupled to a tool bar 18 that supports multiple row units 20. Each row unit 20 is configured to deposit seeds at a desired depth beneath the soil surface, thereby establishing rows of planted seeds. The implement 10 also includes seed tanks 22, and a pneumatic distribution system configured to convey seeds from the tanks to the row units 20. In certain embodiments, the pneumatic distribution system includes an inductor box positioned beneath each seed tank 22. Each inductor box is configured to receive seeds from a respective tank, to fluidize the seeds into an air/seed mixture, and to distribute the air/seed mixture to the row units 20 via a network of pneumatic hoses/conduits.

In certain embodiments, each row unit 20 includes a residue manager, an opening assembly, a seed tube, closing discs, and a press wheel. The residue manager includes a rotating wheel having multiple tillage points or fingers that break up crop residue, thereby preparing the soil for seed deposition. The opening assembly includes a gauge wheel and an opener disc. The gauge wheel may be positioned a vertical distance above the opener disc to establish a desired trench depth for seed deposition into the soil. As the row unit travels across a field, the opener disc excavates a trench into the soil for seed deposition. The seed tube, which may be positioned behind the opening assembly, directs a seed from a metering system into the excavated trench. The closing discs then direct the excavated soil into the trench to cover the planted seed. Finally, the press wheel packs the soil on top of the seed with a desired pressure.

While the illustrated implement 10 includes 24 row units 20, it should be appreciated that alternative implements may include more or fewer row units 20. For example, certain implements 10 may include 6, 8, 12, 16, 24, 32, or 36 row units, or more. In addition, the spacing between row units may be particularly selected based on the type of crop being planting. For example, the row units may be spaced 30 inches from one another for planting corn, and 15 inches from one another for planting soybeans.

Various embodiments of the present disclosure include an inductor assembly for a planting implement. An inductor box of the inductor assembly receives agricultural product (e.g., seed, fertilizer, etc.) from a tank and an airflow to distribute the agricultural product through a network of pneumatic hoses/conduits connected to inductor segments. The inductor segments are arranged in the inductor box with delivery ports extending through a front wall of the inductor box. Mounting clips interface with the delivery ports and an outer surface of the front wall to attach the inductor segments to the inductor box. Installing the mounting clips in an installed position compresses a gasket between an inner surface of the front wall and the inductor segments to form respective seals. The mounting clips interface with the outer surface of the front wall and the delivery ports, thereby exerting forces on the inductor segment in the interior of the inductor box and forming the seals between the inductor segments and the inner surface of the front wall. That is, the mounting clips, which are installed on the outer surface of the front wall, form a seal on the inner surface of the front wall without extending through additional passages of the front wall. The seals form a boundary between the pressurized interior of the inductor box and the external environment. Reducing the quantity of passages through the front wall may reduce leaks between the pressurized interior and the exterior of the inductor box. The mounting clips and assembly method described herein may improve the distribution efficiency of the inductor assembly.

Figure 2:
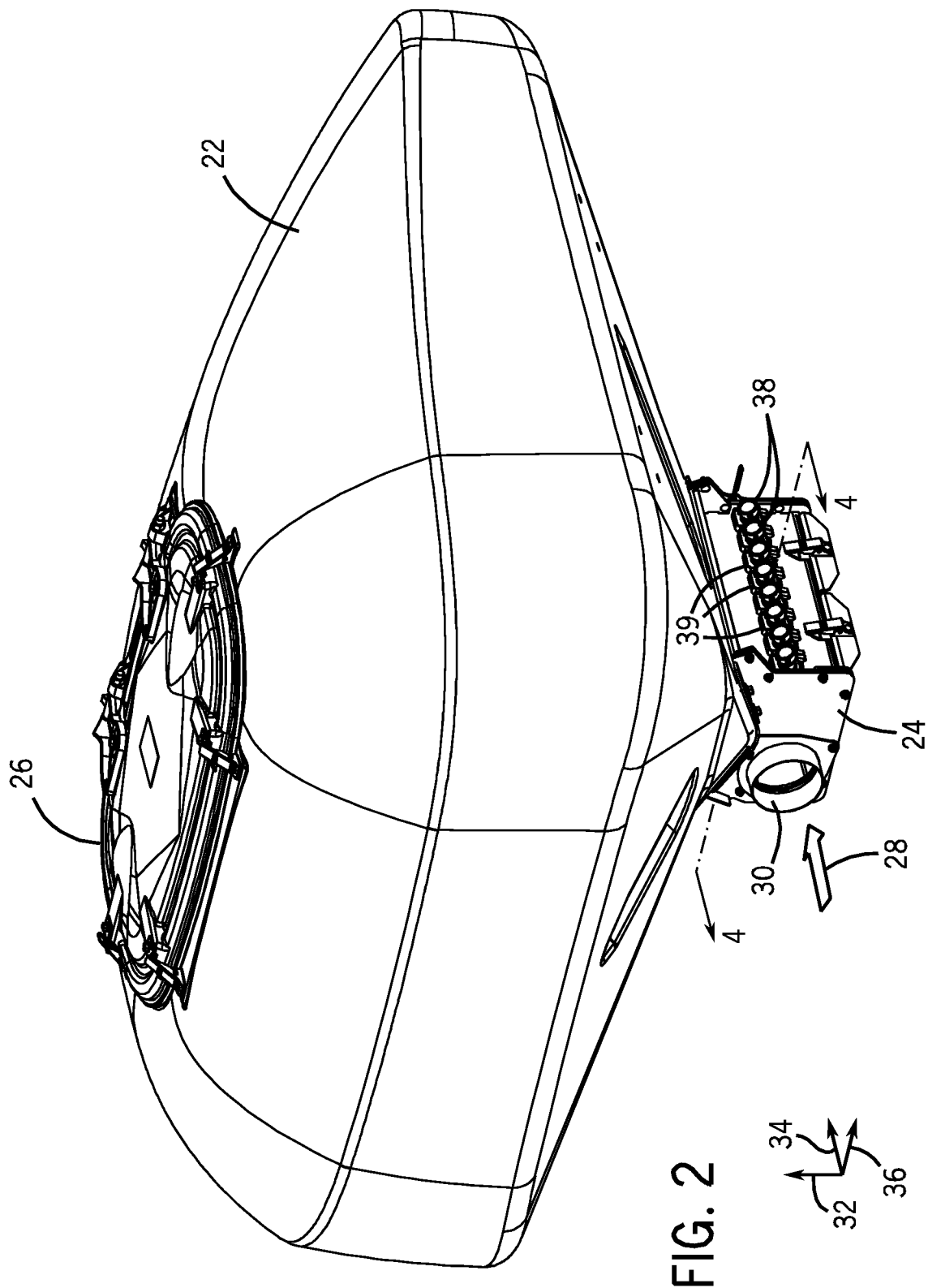
FIG. 2 is a perspective view of an embodiment of a tank and an inductor box of the agricultural implement of FIG. 1.

FIG. 2 is a perspective view of the seed tank 22 and an inductor box 24 of the agricultural implement 10 of FIG. 1. Agricultural product, such as seed, fertilizer, pesticide, fungicide, and so forth, may be added to the seed tank 22 through a hatch 26. The pneumatic distribution system supplies an airflow 28 to the inductor box 24 via an air inlet 30. The airflow 28 pressurizes the seed tank 22 to improve the flow of the agricultural product into the inductor box 24. The inductor box 24 is positioned below the seed tank 22 along a vertical axis 32, enabling gravity to facilitate the flow of the agricultural product into the inductor box 24. The vertical axis 32 (e.g., Y-axis) is substantially perpendicular to the ground. An X-axis 34, as described herein, is substantially parallel to the direction of travel 12 and to the ground. A Z-axis 36, as described herein, is perpendicular to the direction of travel 12 and parallel to the ground. As illustrated, the airflow 28 enters the inductor box 24 along the X-axis 34. Within the inductor box 24, the airflow 28 fluidizes the agricultural product into a mixture that is distributed via delivery ports 38 arranged substantially along the Z-axis 36. Presently contemplated embodiments may position the inductor box 24 at other positions and/or orientations relative to the seed tank 22 based on the configuration of the agricultural implement 10 and/or the desired implement application. Accordingly, the axes 32, 34, and 36 are utilized to describe directions relative to the inductor box 24.

The agricultural implement 10 may have multiple seed tanks 22 connected to multiple inductor boxes 24. Accordingly, the illustrated embodiment of FIG. 2 with eight delivery ports 38 may be a part of an agricultural product delivery system for an agricultural implement 10 with eight row units 20, or an agricultural product delivery system for an agricultural implement 10 with sixteen row units 20. Presently contemplated embodiments are not limited to inductor boxes 24 with eight delivery ports 38. For example, the inductor box 24 may have approximately 4, 6, 8, 10, 12, 14, 16, 18, 20, or more delivery ports 38 to distribute a fluidized agricultural product mixture to the row units 20. Mounting clips 39 interface with the delivery ports 38 and the inductor box 24. The mounting clips 39 secure the delivery ports 38 to the inductor box 24 along the axes 32, 34, and 36. Each mounting clip 39 applies a force to the inductor box 24 and a respective delivery port 38 (e.g., in opposite directions) to form a seal around the respective delivery port 38 within the inductor box 24. The seals may increase the pressure of the agricultural product mixture by reducing leakage from the interior of the inductor box 24 (e.g., around the delivery ports 38).

Figure 3:
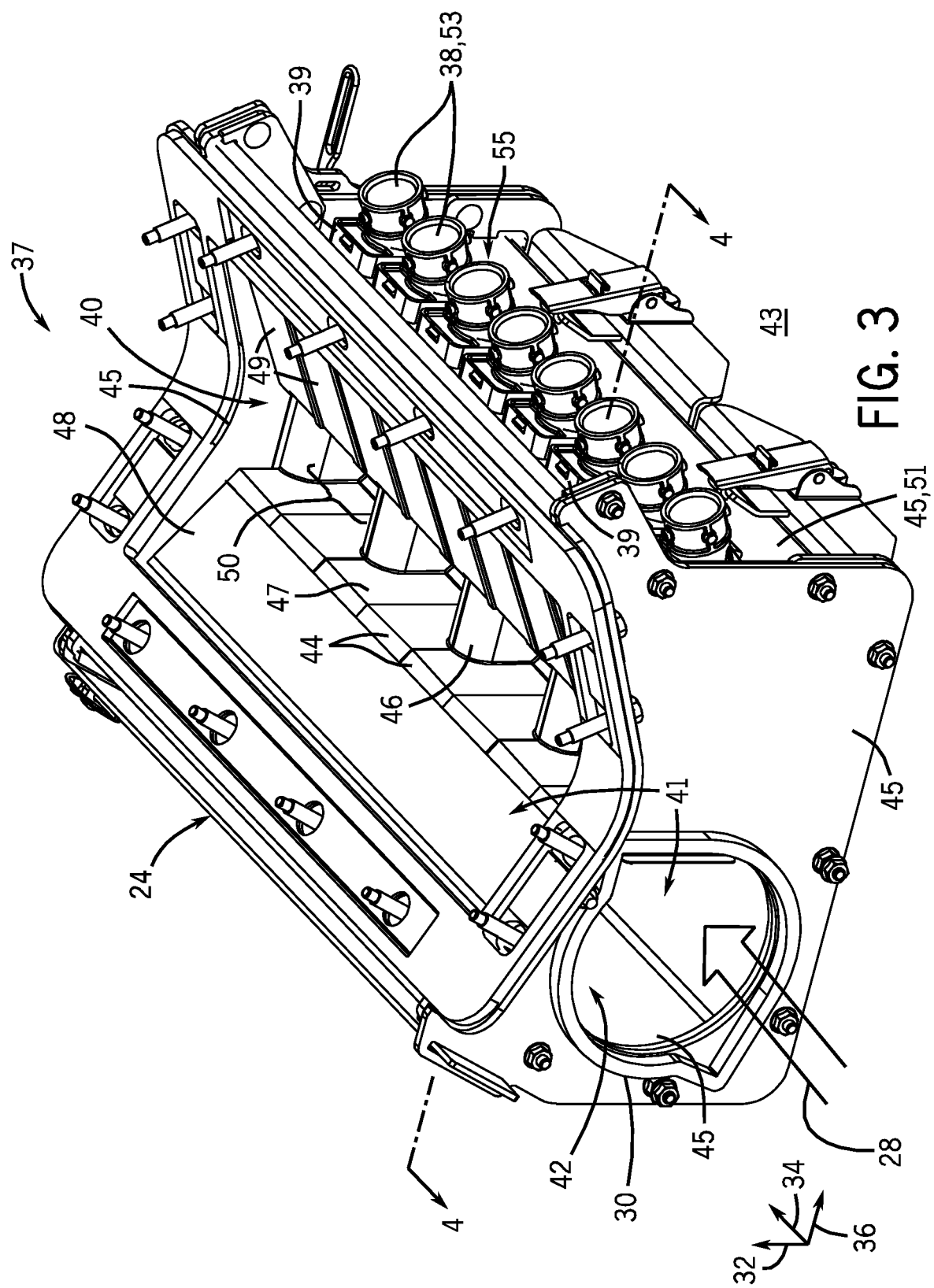
FIG. 3 is a perspective view of an embodiment of the inductor box of FIG. 2.

FIG. 3 is a perspective view of an embodiment of an inductor box assembly 37 with the inductor box 24, inductor segments, and the mounting clips 39. The agricultural product from the seed tank 22 enters an interior 41 of the inductor box 24 through an agricultural product inlet 40. The air inlet 30 receives the airflow 28 into an air supply chamber 42. Inductor segments 44 are positioned between the air supply chamber 42 and the delivery conduits. The inductor segments 44 are arranged in the interior 41 of the inductor box 24 between inductor box walls 45. The inductor box walls 45 separate the interior 41 from an exterior 43 of the inductor box 24. As illustrated, the delivery ports 38 extend through delivery passages in the inductor box walls 45.

During operation, the interior 41 is pressurized by the airflow 28 to fluidize and distribute the agricultural product. The exterior 43 is exposed to an unpressurized ambient environment. Seals between the interior 41 and the exterior 43 around the delivery ports 38 may maintain the pressure difference between the interior 41 and the exterior 43, enabling the inductor box assembly 37 to efficiently utilize the airflow 28 to distribute the agricultural product. A portion of the airflow 28 flows between the agricultural product inlet 40 and the air supply chamber 42 through an upper screen 48, or through a seed screen below air bypass channels 46. Agricultural product flows through gaps 50 between air bypass channels 46 to a seed bed for distribution.

The inductor segments 44 are installed in the interior 41 of the inductor box 24 substantially along the vertical axis 32 through the agricultural product inlet 40. The inductor segments 44 each include a receiving portion 47, a mixing portion 49, and a delivery portion 53. The receiving portion 47 of each inductor segment 44 interfaces with the air supply chamber 42 and receives agricultural product through the agricultural product inlet 40. The mixing portion 49 of each inductor segment 44 is positioned in the interior 41 of the inductor box 24 and interfaces with an inner surface of an inductor box wall 45 (e.g., a front wall 51) and with the delivery passages. Within the mixing portion 49, agricultural product and portions of the airflow 28 mix into the fluidized agricultural product mixture for distribution to the row units 20. The delivery portion 53 (e.g., delivery port 38) of each inductor segment 44 extends through the delivery passages of the front wall 51 to the exterior 43. Each delivery portion 53 supplies the fluidized agricultural product mixture to one or more row units 20. The mounting clips 39 interface with an outer surface 55 of the front wall 51 and the delivery ports 38 on the exterior 43 of the inductor box 24. The mounting clips 39 apply a force to the front wall 51 and to the inductor segments 44 (e.g., in opposite directions) to form seals on the inner surface of the front wall 51 while the mounting clips are installed, as shown in FIG. 3. The mounting clip 39 acts as a wedge between the delivery port 38 and the outer surface 55 of the front wall 51, applying a force on the inductor segment 44 (e.g., the delivery port 38 and mixing portion 49) in a first direction (e.g., along the Z-axis 36) and a force on the front wall 51 in an opposite second direction (e.g., along the Z-axis 36). The force on the inductor segment 44 presses the mixing portion 49 towards an inner surface of the front wall 51, to facilitate formation of a seal about the delivery ports 38 in the interior 41. The seals form a barrier between the interior 41 and the exterior 43 about the delivery ports 38.

Figure 4:
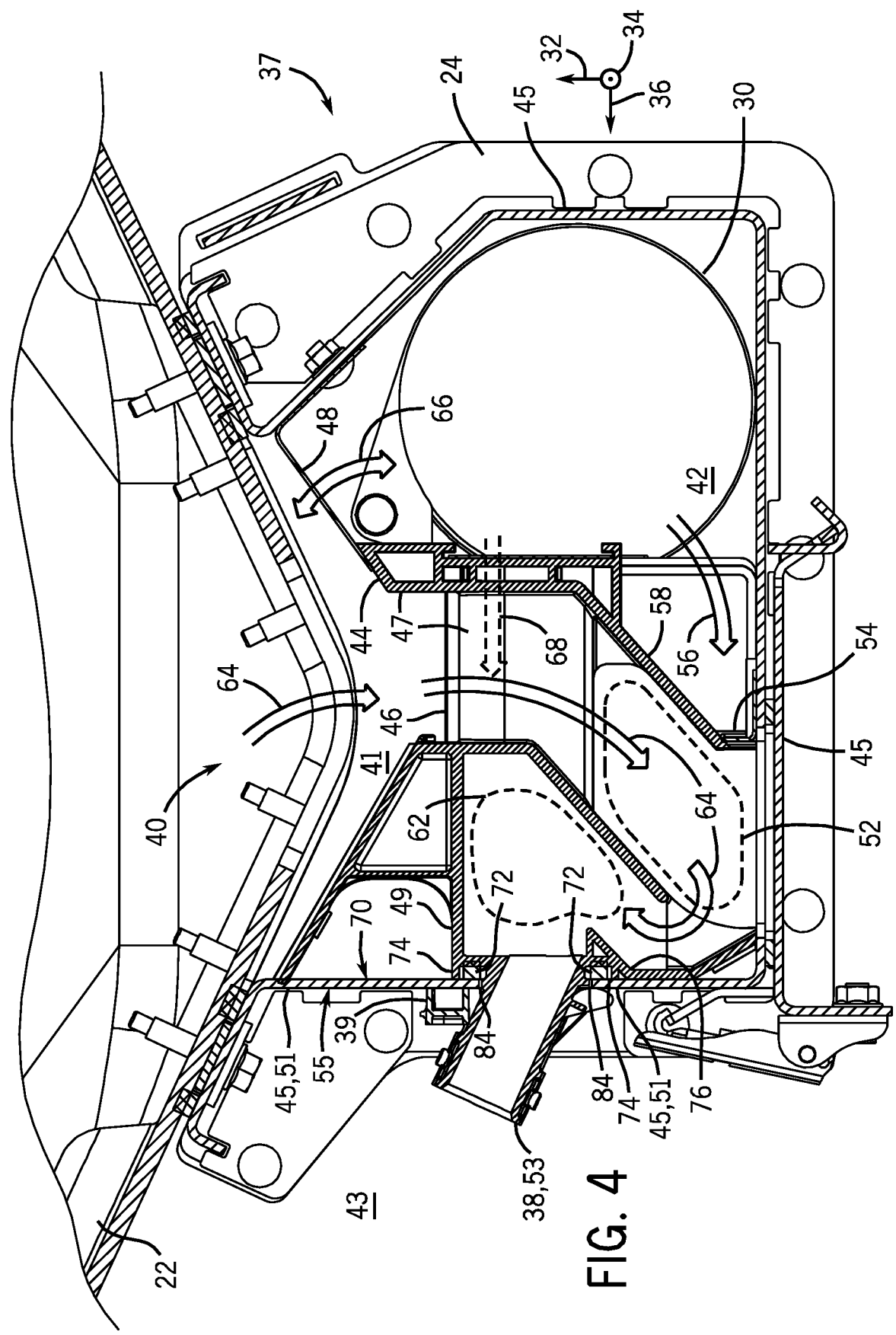
FIG. 4 is a cross-sectional view of an embodiment of the tank and the inductor box of FIG. 2, taken along line 4-4.

FIG. 4 is a cross-sectional view of an embodiment of the inductor box 24 and the seed tank 22 shown in FIG. 2, taken along line 4-4 through an inductor segment 44. The agricultural product from the seed tank 22 is received through the agricultural product inlet 40 between the air supply chamber 42 and the delivery port 38. The agricultural product may collect in a seed bed 52 at the bottom of the inductor box 24. A seed screen 54 enables a mixing airflow 56 from the airflow 28 to pass through the seed bed 52. A body 58 of the inductor segment 44 above the seed screen 54 guides the agricultural product from the agricultural product inlet 40 to the seed bed 52. The mixing airflow 56 from the air supply chamber 42 flows over and/or through agricultural product in the seed bed 52 to bring agricultural product to a mixing chamber 62 (e.g., fluidization chamber). Accordingly, an agricultural product flowpath 64 extends from the seed tank 22 to the mixing chamber 62.

In some embodiments, a tank airflow 66 may pass through the upper screen 48 between the air supply chamber 42 and the seed tank 22. Accordingly, the seed tank 22 may be pressurized by the air supply chamber 42. In other embodiments, the seed tank 22 is pressurized separately from the air supply chamber 42, and the air supply chamber 42 may receive the tank airflow 66 from the seed tank 22.

The mixing airflow 56, the agricultural product, and a bypass airflow 68 mix within the mixing chamber 62 to deliver the agricultural product. The mixing chamber 62 is within the mixing portion 49 of the inductor segment 44 in the interior 41 of the inductor box 24. Backpressure from the row units 20 in fluid connection with the mixing chamber 62 through the delivery port 38 may control the quantity of the agricultural product delivered through the delivery port 38. The bypass airflow 68 from the air bypass channel 46 along with the mixing airflow from the seedbed pressurizes and fluidizes the agricultural product for distribution. The bypass channels 46 enable the bypass airflow 68 to mix with agricultural product in the mixing chamber 62 without substantially disturbing the flow of the agricultural product from the agricultural product inlet 40 to the seed bed 52. In some embodiments, the bypass airflow 68 through the air bypass channels 46 may be between approximately 50 to 75 percent of the airflow 28. The quantity of the mixing flow 56 through and/or over the seed bed 52 may be controlled to be sufficient to carry agricultural product to the mixing chamber 62 for each inductor segment 44. For example, the mixing flow 56 may be less than approximately 50 percent of the airflow 28.

The delivery port 38 of the delivery portion 53 extends through an inner surface 70 and the outer surface 55 of the front wall 51. The delivery port 38 extends through a delivery passage 84 in the front wall 51. A gasket 72 is positioned about the delivery port 38 between the inductor segment 44 and the inner surface 70. The gasket 72 forms a seal between the interior 41 and the exterior 43 of the inductor box 24. The gasket 72 is disposed between the inner surface 70 and the mixing portion 49 to form a seal between the pressurized interior 41 (e.g., the pressurized airflow 28 and the fluidized agricultural product mixture) and the exterior 43. The mounting clip 39 is installed about the delivery port 38 and interfaces with the outer surface 55. The installed mounting clip 39 applies a force to compress the gasket 72 between the inductor segment 44 and the inner surface 70. The mounting clip 39 acts as a wedge between the delivery port 38 and the front wall 51 to apply the force to compress the gasket 72 and thereby form the seal. The installed mounting clip 39 exerts a force on the delivery port 38 along the Z-axis 36 away from the inductor box 24, while exerting a force on the outer surface 55 in the opposite direction along the Z-axis 36 toward the air supply chamber 42. The force on the delivery port 38 along the Z-axis 36 directs the mixing region 49 of the inductor segment 44 toward the inner surface 70, thereby compressing the gasket 72.

In the illustrated embodiments, one or more flanges 74 of the inductor segment 44 extend from the mixing portion 49 toward the inner surface 70. The flanges 74 also extend around the gasket 72 to block the compression of the gasket 72 beyond a desired compression limit. As may be appreciated, a thickness of the one or more flanges 74 is selected based on the desired compression limit of the gasket 72. By blocking over-compression of the gasket 72, the longevity of the gasket 72 may be increased. The flanges 74 may form a secondary seal between the interior 41 and the exterior 43 of the inductor box 24. Furthermore, a leg 76 of the mixing portion 49 interfaces with inner surface 70 of the front wall 51 to block compression of the gasket 72 beyond the desired compression limit. The flanges 74 and/or leg 76 may thereby improve the seal between the inductor segment 44 and the front wall 51.

The mounting clips 39 enable an operator to manually install and remove inductor segments 44 from the inductor box 24 (e.g., for maintenance or replacement) without utilizing special tools. The mounting clips 39 facilitate formation of a seal about the delivery ports 38 without transecting the front wall 51.

FIG. 5 is a perspective view of an embodiment of the inductor assembly 37 in a partially assembled state. Some components of the inductor box assembly 37 shown in FIGS. 3 and 4 are omitted here for clarity. As illustrated, the inductor assembly 37 includes two inductor segments 44 with delivery ports 38 extending through the front wall 51 of the inductor box 24. A first inductor segment 80 and a second inductor segment 86 are positioned within the interior 41 of the inductor box 24 so that a first delivery portion 82 and a second delivery portion 88 extend through delivery passages 84 of the front wall 51. A second mounting clip 90, which is in an installed position, secures the second inductor segment 86 to the inductor box 24. Gaskets 72 are positioned about the respective delivery ports 38 and the respective delivery passages 84 between the inductor segments 86, 88 and the inner surface 70.

In some embodiments, the mounting clip 39 is a U-shaped clip that is installed in a radial direction 92 about a delivery port axis 94. During assembly, a first mounting clip 96 is rotated into the installed position about the first delivery port 82, as shown by arrow 98. In the installed position, arms 102 of the U-shaped mounting clip 39 are biased against the outer surface 55 of the front wall 51 and against a mounting feature 104 of the delivery ports 38. That is, the arms 102 may be biased to curve about the X-axis 34 so that when the U-shaped mounting clips 39 are installed, the arms 102 abut the outer surface 55 of the inductor box 24 (e.g., within a plane along the vertical axis 32 and X-axis 34). As illustrated, locking features 106 (e.g., detents, grooves) mate with the mounting feature 104 and enable the mounting clip 39 to snap into the installed position. Accordingly, the locking features 106 may provide a visual and/or audible indication that the mounting clip 39 is in the installed position about the delivery port 38.

While the mounting clip 39 is in the installed position about the delivery port 38, the inductor segment 44 interfaces with the gasket 72 and forms the seal between the interior 41 and the exterior 43 of the inductor box 24. Accordingly, the visual and/or audible indication that the mounting clip 39 is in the installed position enables an operator to verify that the seal has been formed between the interior 41 and the exterior 43 of the inductor box 24. The visual and/or audible indication enables the inductor segment 44 to be installed in the inductor box 24 without over-compressing the gasket 72. In some embodiments, each inductor segment 44 forms a seal with a separate gasket 72. The gasket 72 may be attached to the mixing portion 49, or to the inner surface 70, about the delivery passage 84. For example, the gasket 72 may be an O-ring that circumscribes the delivery passage 84. In other embodiments, the gasket 72 may be shared among two or more inductor segments 44 to form multiple seals between the inner surface 70 and the two or more inductor segments 44. For example, the gasket 72 may be attached to the inner surface 70, and may extend about two or more delivery passages 84.

The geometry of the mounting clip 39 facilitates manual installation and removal of the mounting clip 39. For example, a tab 108 and a recess 110 may enable quick installation and removal of the mounting clip 39 in the radial direction 92. The tab 108 is aligned along an axis parallel to the radial direction 92 to aid installation and removal. An operator may remove the mounting clip 39 by pulling on the tab 108 in the radial direction 92. The tab 108 and recess 110 may be grasped to provide the operator secure points on the mounting clip 39 to accommodate removable installation in, and opposite to, the radial direction 92. As may be appreciated, the positions of the tab 108 and the recess 110 relative to delivery port 38 may indicate to the operator the proper direction (e.g., radial direction 92) and orientation (e.g., recess 110 opposite the front wall 51) for installation of the mounting clip 39. Moreover, the mounting clips 39 may be interchangeable with one another. For example, the first mounting clip 96 may be interchanged with the second mounting clip 90. Utilizing the mounting clip 39, the inductor segments 44 may be secured to the inductor box 24 without utilizing threaded fasteners that transect the inductor box wall 45.

Each mounting clip 39 may reduce the quantity of components (e.g., threaded fasteners, nuts, etc.) used to mount a respective inductor segment 44 within the inductor box 24. Reducing the quantity of components of the inductor assembly 37 may decrease assembly time and associated costs. Moreover, in some embodiments, the mounting clips 39 are manually installed and/or removed without specialized tools (e.g., screw driver, wrench, etc.), thereby simplifying the coupling of the inductor segments 44 to the inductor box 24. Whereas some fasteners (e.g., screw, bolt) attach two or more components of an assembly by transecting a component of the assembly, the mounting clips 39 facilitate formation of a seal about the delivery port 38 without extending through the front wall 51. Additionally, the mounting clips 39 may remain in the installed position despite vibrations encountered during operations. That is, vibrations may not loosen the mounting clips 39.

The components of the inductor box assembly 37, such as the inductor segments 44, the one or more gaskets 72, and the mounting clips 39, may be made from various materials (e.g., plastics, metals, composites, etc.). In some embodiments, the inductor segments 44 are formed of plastic. Materials for the one or more gaskets 72 may include, but are not limited to foam (e.g., polystyrene, polyurethane), elastomer (e.g., natural rubber, synthetic rubber), plastic, and so forth. For example, a gasket 72 may be an elastomeric O-ring that circumscribes a delivery passage 84. The mounting clip 39 may be formed from a plastic (e.g., an injection molded plastic), a metal, another suitable material, or any combination thereof. In certain embodiments, the mounting clips 39 are configured to only interface with the outer surface 55 of the inductor box 24 and the delivery ports 38. Additionally, the mounting clips 39 are separated from the gaskets 72 by the front wall 51. The mounting clips 39 are installed to urge the delivery ports 38 outwardly from the outer surface 55, thereby directing the mixing portions 49 of the inductor segments 44 to compress the one or more gaskets 72 against the inner surface 70. The compressed gaskets 72 between the inductor segments 44 and the inner surface 70 form the seals in the interior 41.

The mounting clips 39 may be installed into and removed from the installed position without substantially affecting the quality of the seals because the mounting clips 39 do not transect the walls 45 of the inductor box 24, as compared to threaded fasteners (e.g., screws, bolts). Furthermore, the mounting clips 39 enable the gasket 72 to seal each respective delivery port 38 (e.g., block flow between the interior 41 and the exterior 43 of the inductor box) without transecting the front wall 51. In some embodiments, the one or more gaskets 72 may be replaced at predetermined intervals, such as after approximately 20 installations of the mounting clips 39, or after several planting seasons. The seals about the delivery ports 38 increase the efficiency of distributing the fluidized agricultural product mixture through the delivery ports 38 to the row units 20. In addition, the seals between the delivery ports 38 and the front wall 51 may reduce leaks between the pressurized environment of the interior 41 of the inductor box and the environment about the inductor box 24, as compared to inductor segments attached via threaded connections to the inductor box.

Figure 5:
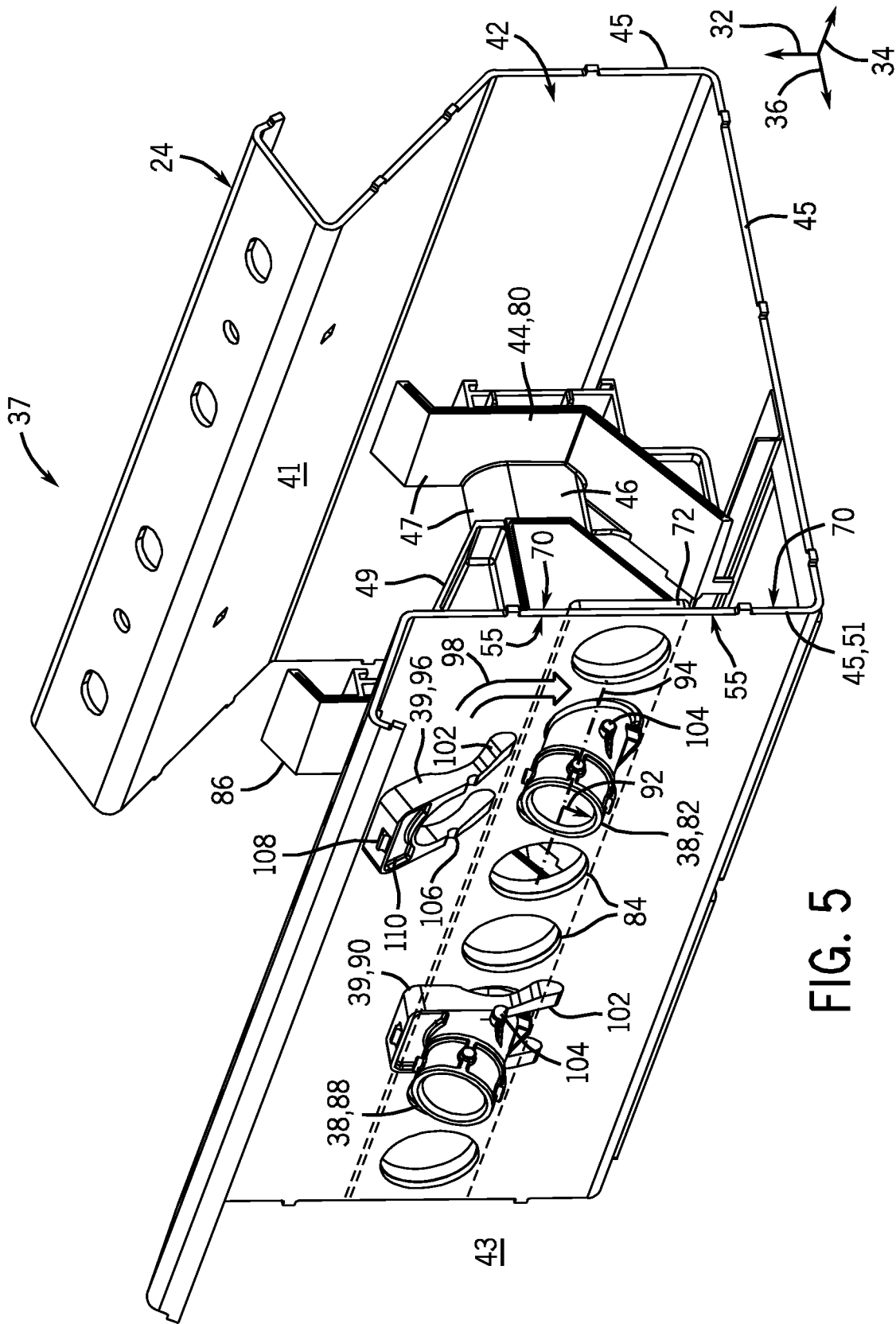
FIG. 5 is a perspective view of an embodiment of the inductor box with mounting clips and inductor segments.
Figure 6:
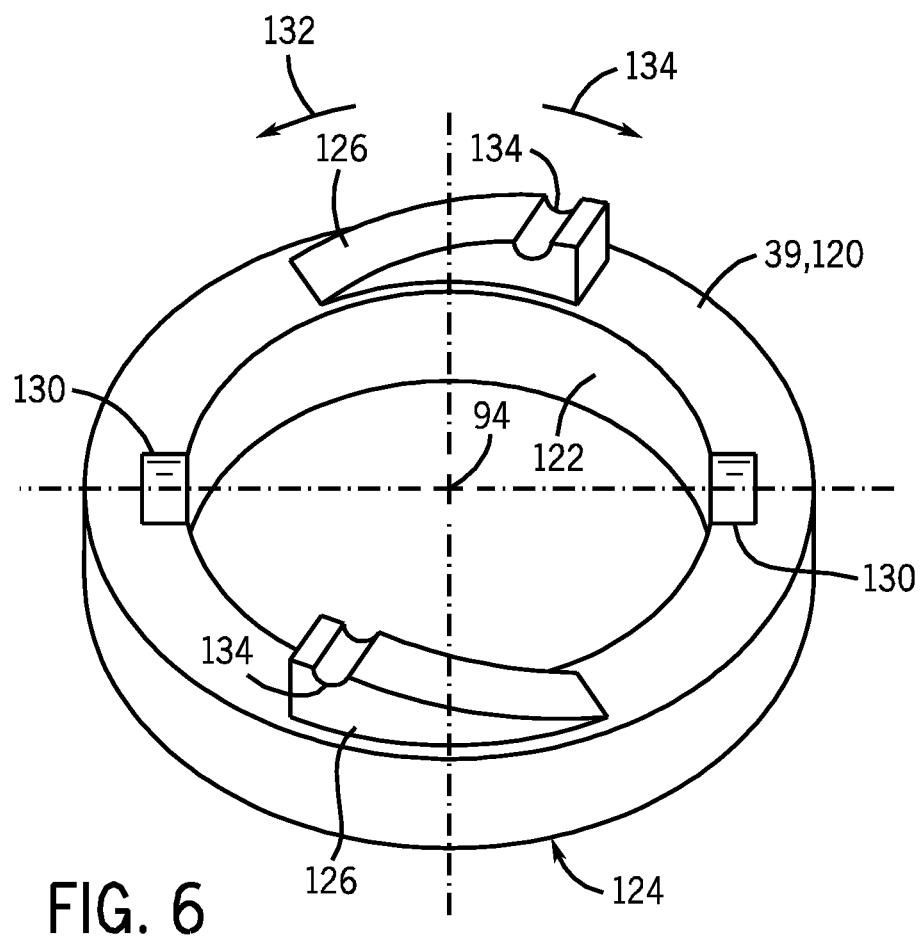
FIG. 6 is a perspective view of an embodiment of a mounting clip of an inductor assembly.

FIG. 6 is a perspective view of an embodiment of a mounting clip 120 of the inductor assembly 37 with a collar shape that facilitates installation about a delivery port 38 via rotation of the mounting clip 120. Whereas the mounting clip 39 shown in FIG. 5 is installed in a radial direction 92 relative to the delivery port axis 94, the mounting clip 120 may be installed along the delivery port axis 94. An annular surface 122 interfaces with the delivery port 38 and a rear surface 124 interfaces with the outer surface 55 of the inductor box 24. Wedges 126 on a front face 128 of the mounting clip 120 interact with the mating features 104 of the delivery ports while the mounting clip 120 is in the installed position. Notches 130 in the annular surface 122 enable the mounting clip 120 to pass over the mating features 104 of the delivery port 38 as the mounting clip 120 is installed along the delivery port axis 94. When the rear surface 124 interfaces with the outer surface 55, the mounting clip 120 may be rotated in a first direction 132 (e.g., counter-clockwise) into the installed position, thereby pressing the wedges 126 against the mating features 104 and the rear surface 124 against the outer surface 55. The mounting clip 120, while in the installed position, applies a force to compress the gasket 72 between the inner surface 70 and an inductor segment 44, thereby forming the seal between the interior 41 and the exterior 43 of the inductor box 24.

Grooves 134 in the wedges 126 interface with the mating features 104 to retain the mounting clip 120 in the installed position. Rotation of the mounting clip 120 in an opposite second direction 134 (e.g., clockwise) enables the mounting clip 120 to be removed and enables the seal to be released, such as for maintenance or removal of the inductor segment 44. Other embodiments of the mounting clip 120 may have different configurations of wedges 126 that interact with the mating features 104 of the delivery port 38 upon rotation of the clip in the second direction 134. In some embodiments, the mounting clip 120 has a collar shape, but is a partial collar rather than the full collar, as shown.

In some embodiments, the mounting clips 39 are unidirectionally installed about the delivery ports 38. That is, some portions of the mounting clips 39 (e.g., the locking features 106 of the U-shaped mounting clips, or the wedges 126 of the collar shaped mounting clips) may be configured to interface with mating features 104 of the delivery port 38, whereas other portions of the mounting clips 39 (e.g., the biased arms 102 of the U-shaped mounting clips, or the rear surface 124 of the collar shaped mounting clips) may be configured to interface with the outer surface 55. In some embodiments, the geometry of the mounting clips 39 enables each mounting clip 39 to be interchangeable with other mounting clips 39 about the delivery ports 38.

The mounting clips 39 described herein are installed from the exterior 43 of the inductor box 24. Furthermore, the mounting clips 39 do not transect the inductor box walls 45. The mounting clips 39 may be manually installed without special tools. In some embodiments, the mounting clips 39 may snap into the installed position and provide a visual and/or audible indicator that the mounting clip 39 is in the installation position, thereby facilitating formation of a seal between the interior 41 and the exterior 43 of the inductor box 24. The mounting clips 39 may decrease the assembly time and associated expenses for the inductor assembly. Additionally, the mounting clips 39 may secure the inductor segments to the inductor box 24 without loosening due to vibrations.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of manufacturing an inductor assembly of an agricultural implement, comprising:
  interfacing a gasket with an inner surface of an inductor box, wherein the gasket circumscribes a first delivery passage extending from the inner surface to an outer surface of the inductor box;

positioning a first inductor segment within the inductor box, wherein the first inductor segment comprises a first mixing portion and a first delivery portion, and the first delivery portion extends from the first mixing portion;

inserting the first delivery portion through the gasket and the first delivery passage;

compressing the gasket to form a first seal between the inner surface of the inductor box and the first mixing portion; and installing a first mounting clip into a first installed position about the first delivery portion, wherein the first mounting clip, while in the first installed position, is configured to maintain the first seal by interfacing with the outer surface of the inductor box.

2. The method of claim 1, wherein the first mounting clip snaps into the first installed position.

3. The method of claim 1, wherein installing the first mounting clip comprises rotating the first mounting clip about the first delivery portion.

4. The method of claim 3, wherein installing the first mounting clip comprises translating the first mounting clip along the first delivery portion before rotating the first mounting clip.

5. The method of claim 1, wherein the first mixing portion comprises one or more flanges configured to block overcompression of the gasket.

6. The method of claim 1, comprising:
interfacing the gasket with the inner surface about a second delivery passage of the inductor box;
positioning a second inductor segment within the inductor box, wherein the second inductor segment comprises a second mixing portion and a second delivery portion, and the second delivery portion extends from the second mixing portion;
inserting the second delivery portion through the gasket and the second delivery passage, wherein the second delivery passage extends from the inner surface of the inductor box to the outer surface of the inductor box;
compressing the gasket to form a second seal between the inner surface of the inductor box and the second mixing portion; and
installing a second mounting clip into a second installed position about the second delivery portion, wherein the second mounting clip, while in the second installed position, is configured to maintain the second seal by interfacing with the outer surface of the inductor box.

7. The method of claim 6, wherein the first mounting clip is interchangeable with the second mounting clip.

8. A method of manufacturing an inductor assembly of an agricultural implement, comprising:
positioning a first inductor segment within an inductor box, wherein the first inductor segment comprises a first mixing portion and a first delivery portion, and the first delivery portion extends from the first mixing portion;
inserting the first delivery portion through a first delivery passage of the inductor box, wherein the first delivery passage extends from an inner surface of the inductor box to an outer surface of the inductor box;
driving the first mixing portion of the first inductor segment toward the inner surface of the inductor box to form a first seal between the inner surface of the inductor box and the first mixing portion; and installing a first mounting clip into a first installed position about the first delivery portion, wherein the first mounting clip, while in the first installed position, is configured to maintain the first seal by interfacing with the outer surface of the inductor box.

9. The method of claim 8, wherein the first mounting clip snaps into the first installed position.

10. The method of claim 8, wherein installing the first mounting clip comprises rotating the first mounting clip about the first delivery portion.

11. The method of claim 10, wherein installing the first mounting clip comprises translating the first mounting clip along the first delivery portion before rotating the first mounting clip.

12. The method of claim 8, comprising:
positioning a second inductor segment within the inductor box, wherein the second inductor segment comprises a second mixing portion and a second delivery portion, and the second delivery portion extends from the second mixing portion;
inserting the second delivery portion through a second delivery passage of the inductor box, wherein the second delivery passage extends from the inner surface of the inductor box to the outer surface of the inductor box;
driving the second mixing portion of the second inductor segment toward the inner surface of the inductor box to form a second seal between the inner surface of the inductor box and the second mixing portion; and
installing a second mounting clip into a second installed position about the second delivery portion, wherein the second mounting clip, while in the second installed position, is configured to maintain the second seal by interfacing with the outer surface of the inductor box.

13. The method of claim 12, wherein the first mounting clip is interchangeable with the second mounting clip.

14. A method of manufacturing an inductor assembly of an agricultural implement, comprising:
interfacing a gasket with an inner surface of an inductor box, such that the gasket circumscribes a delivery passage of the inductor box extending from the inner surface of the inductor box to an outer surface of the inductor box;
positioning an inductor segment within the inductor box, such that a delivery portion of the inductor box extends through the gasket and the delivery passage; and
installing a mounting clip into an installed position about the delivery portion of the inductor segment, such that the mounting clip interfaces with the outer surface of the inductor box and the delivery portion of the inductor segment and applies a force that compresses the gasket between the inner surface of the inductor box and the inductor segment to form a seal between the inner surface of the inductor box and the inductor segment, wherein the mounting clip does not interface with the inner surface of the inductor box.

15. The method of claim 14, wherein the mounting clip snaps into the installed position.

16. The method of claim 14, wherein installing the mounting clip comprises rotating the mounting clip about the delivery portion.

17. The method of claim 16, wherein installing the mounting clip comprises translating the mounting clip along the delivery portion before rotating the mounting clip.

18. The method of claim 14, wherein the inductor segment comprises one or more flanges configured to block overcompression of the gasket.

19. The method of claim 14, comprising coupling the gasket to the inner surface of the inductor box or the inductor segment.

20. The method of claim 14, wherein the gasket comprises a foam, an elastomer, or a combination thereof.

* * * * *